(12) United States Patent
Bennett

(10) Patent No.: US 11,015,300 B2
(45) Date of Patent: May 25, 2021

(54) TRACTION ENABLING DEVICE IN APPLICATION TO ICY ROADWAYS

(71) Applicant: Reginald M Bennett, Clinton, MS (US)

(72) Inventor: Reginald M Bennett, Clinton, MS (US)

( * ) Notice: Subject to any disclaimer, the term of this patent is extended or adjusted under 35 U.S.C. 154(b) by 67 days.

(21) Appl. No.: 16/576,911

(22) Filed: Sep. 20, 2019

(65) Prior Publication Data

US 2020/0095735 A1 Mar. 26, 2020

Related U.S. Application Data

(60) Provisional application No. 62/733,733, filed on Sep. 20, 2018.

(51) Int. Cl.
*E01C 11/00* (2006.01)
*E01C 11/24* (2006.01)

(52) U.S. Cl.
CPC .................................. *E01C 11/24* (2013.01)

(58) Field of Classification Search
CPC ...................................................... E01C 11/24
USPC .............................................. 404/6, 72, 9–11
See application file for complete search history.

(56) References Cited

U.S. PATENT DOCUMENTS

| | | | | |
|---|---|---|---|---|
| 1,732,869 A | * | 10/1929 | Wambach | E01F 9/512 |
| | | | | 40/615 |
| 3,289,939 A | * | 12/1966 | Martinov | B60Q 7/005 |
| | | | | 238/14 |
| 3,630,440 A | * | 12/1971 | Sams | B60B 39/12 |
| | | | | 238/14 |
| 3,708,117 A | * | 1/1973 | Coale | B60B 39/12 |
| | | | | 238/14 |
| 3,918,638 A | * | 11/1975 | Nelson | B60B 39/12 |
| | | | | 238/14 |
| 4,135,839 A | * | 1/1979 | Engwall | E01F 9/529 |
| | | | | 404/16 |
| 4,261,510 A | * | 4/1981 | Andrus | B60B 39/12 |
| | | | | 238/14 |
| 4,362,424 A | * | 12/1982 | Barber | E01F 13/044 |
| | | | | 293/107 |
| 4,687,369 A | * | 8/1987 | McDonald | E01F 9/688 |
| | | | | 116/63 P |
| 5,242,242 A | * | 9/1993 | Young | E01F 9/50 |
| | | | | 404/12 |
| 6,024,510 A | * | 2/2000 | Kamienchick | E01F 9/529 |
| | | | | 404/15 |

(Continued)

*Primary Examiner* — Raymond W Addie

(57) ABSTRACT

The present invention provides a vehicle traction device which may be conveniently attached and applied to roadways that are subject to accumulations of ice, snow, and other wintry precipitation. The vehicle traction device provides a center strip which deters unintended horizontal motion of vehicles as well as skidding, sliding, spinning, and the general loss of traction. The center strip can include a collapsible support system which will allow the center strip to collapse to low height to permit the passage of road clearing equipment or other low clearance vehicles. In addition, the vehicle traction device provides angled strips which deter unintended sliding motion forward or reverse relative to the normal flow of traffic, especially when vehicles are ascending or descending along steeply sloping roadways. Finally, the vehicle traction device further provides bristle strips which help to dislodge ice and other accumulations on vehicle tires which may interfere with vehicle traction.

20 Claims, 10 Drawing Sheets

(56) References Cited

U.S. PATENT DOCUMENTS

| | | | | |
|---|---|---|---|---|
| 6,174,103 | B1* | 1/2001 | Stroman | E01F 15/086 |
| | | | | 404/15 |
| 6,623,206 | B1* | 9/2003 | Blair | G08G 1/02 |
| | | | | 404/12 |
| 6,752,564 | B1* | 6/2004 | Iskhakbayev | E01F 13/022 |
| | | | | 404/6 |
| 7,967,526 | B2* | 6/2011 | Aguilera Galeote | E01F 9/529 |
| | | | | 404/15 |
| 8,684,625 | B2* | 4/2014 | Garcia Garcia | E01F 9/529 |
| | | | | 404/15 |
| 2002/0046692 | A1* | 4/2002 | Pharo | G07C 11/00 |
| | | | | 116/200 |
| 2007/0237579 | A1* | 10/2007 | Moscovitch | E01F 9/529 |
| | | | | 404/15 |
| 2012/0189385 | A1* | 7/2012 | Garcia Garcia | E01F 9/529 |
| | | | | 404/9 |
| 2013/0008972 | A1* | 1/2013 | Lubinitsky | B60B 39/12 |
| | | | | 238/14 |

* cited by examiner

# TRACTION ENABLING DEVICE IN APPLICATION TO ICY ROADWAYS

CROSS-REFERENCE TO RELATED APPLICATIONS

This application claims the benefit of previously filed provisional application No. 62/733,733, filed Sep. 20, 2018.

BACKGROUND OF THE INVENTION

A. Field of the Disclosure

The present disclosure relates generally to a road vehicle tire traction support device to be applied to roadways and bridges during inclement winter weather conditions where precipitation has reduced otherwise normal traction.

B. Background

Wintry precipitation in the form of freezing rain, sleet, and snow pose a challenge for road vehicles passing over paved roadways and bridges. This device is intended to be applied to roadways and to facilitate additional traction and control measures for vehicles passing over roadways with degraded traction imposed by wintry weather.

BRIEF SUMMARY OF THE INVENTION

The objectives described above are accomplished by the device described in this disclosure, although it is to be understood that not all such objectives will necessarily be accomplished by every embodiment of the device.

The device is safe and environmentally friendly and is intended to improve road conditions. The device can be applied to paved roads using a common pavement-to-rubber adhesive, in a similar fashion as current lane reflectors and removable road bumps. The device is designed to impede side-to-side motions and sliding often experienced by automobiles that lose traction on icy roadways. The device also provides intermittent traction strips to support forward/rear motion in each vehicle's respective lane and to deter spinouts.

The purpose of this device is to enhance traction, motorist control, and maneuverability for auto vehicles on icy roadways, and thereby to prevent potential accidents and traffic pile-ups. This device, unlike similar traction devices designed to assist individual vehicles, such as tire chains and studded winter tires, is intended to improve road conditions for every vehicle in operation on non-ideal pavement conditions due to the accumulation of wintry precipitation. This unique feature facilitates normal traffic flow for all motor vehicles traveling over the road.

This device accomplishes its purpose by limiting side-to-side motion and preventing complete 180 to 360 degree turns or spinouts of wheeled vehicles in operation over icy roadways. This device, when correctly installed and applied to a paved road, intentionally inhibits a vehicle's tendency to slide in adverse or unintended directions by introducing uneven ground layers that provide traction and stability, facilitating continuous motion in the forward-reverse direction. Such uneven ground layers can consist of strips of material, which could be comparable in makeup to that of vehicle tires, and strategically reinforced so that raised surface areas deter sliding motions for over-the-road vehicles. The raised strips are intended to aid in forward-travel motion through the application of raised traction promoters positioned perpendicular to the flow of traffic, allowing vehicle tires passage, while also providing structure for support and bracing in case a motor vehicle's tires lose traction and begin to spin. This will assist a vehicle to achieve and maintain motion in the intended direction.

The major portion of the raised surface area (sometimes referred to as the center strip) runs in parallel with roadway lanes and the direction of normal traffic flow. The width and height of this center strip are preferably limited to permit clearance of the smallest four-wheeled-base vehicles operating on the roadway, while being sufficiently large to deter the side-to-side swaying and sliding that is often induced on icy roadways.

In the preferred embodiment of the present invention, two different types of strips are arranged perpendicular to the normal flow of traffic. One such strip is angled and similar in shape and geometry to that of a one-way speed hump. This strip would preferably have an angled apex constructed so that a smooth gradual increase in elevation is allowed only in the direction of the flow of traffic, while a more abrupt change in elevation is present in the adverse direction.

The other strip can be constructed from the same or a similar material and be cast in the shape of a plurality of bristles, giving vehicle tires traction as they pass over the strips. Both types of strips can vary in width and height depending on the dimensions required for vehicle clearance and the desired degree of traction assistance in the intended application. The two types of strips may be repeated periodically at varying distance intervals, and in various patterns of alternation and repetition, depending on the requirements of the intended application.

In addition, the center strip of the vehicle traction device can be constructed to include a collapsible support system, including a plurality of interlocking collapsible supports. This collapsible support system can be arranged to permit the center strip to collapse to an acceptable height to allow the passage of road clearing equipment or other vehicles with low clearance. Once such low-clearance vehicles have cleared the area, the collapsible support system will return the center strip to its original height to restrict and deter unintentional horizontal translation.

DETAILED DESCRIPTION OF THE INVENTION

Figure 1:
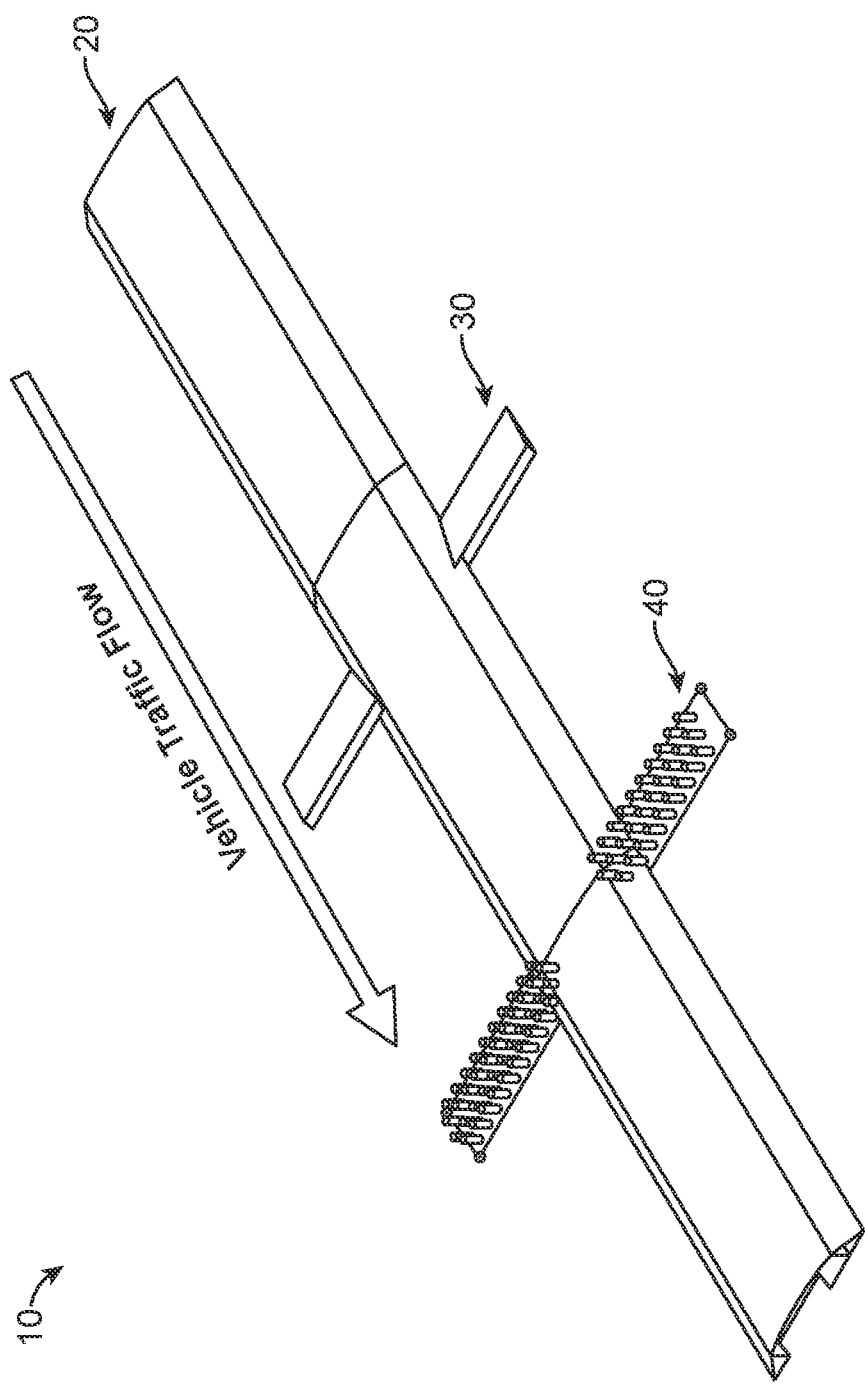
FIG. 1 is an isometric view showing a segment of the vehicle traction device.

Beginning with reference to FIG. 1, in which the vehicle traction device (10) is shown in an overall, isometric view, the vehicle traction device (10) includes three types of strips extending in directions both parallel and perpendicular to the flow of traffic. A center strip (20) is included running parallel to the flow of traffic. The center strip (20) is constructed with dimensions designed not to interfere with a vehicle's tires during normal driving operations. Attached to the center strip (20) and arranged perpendicular to the flow of traffic are a plurality of angled strips (30) and bristle strips (40). FIG. 1 illustrates a segment of the vehicle traction device (10) in which one angled strip (30) and one bristle strip (40) are present. The angled strips (30) and bristle strips (40) are intended to enhance traction for vehicle tires by intermittently engaging each tire as it passes over an angled strip (30) or bristle strip (40). Those of skill in the art will recognize that the angled strips (30) and bristle strips (40) could be combined in varying patterns of frequency and repetition, depending on the expected conditions and intended use and application of the vehicle traction device (10).

Figure 2:
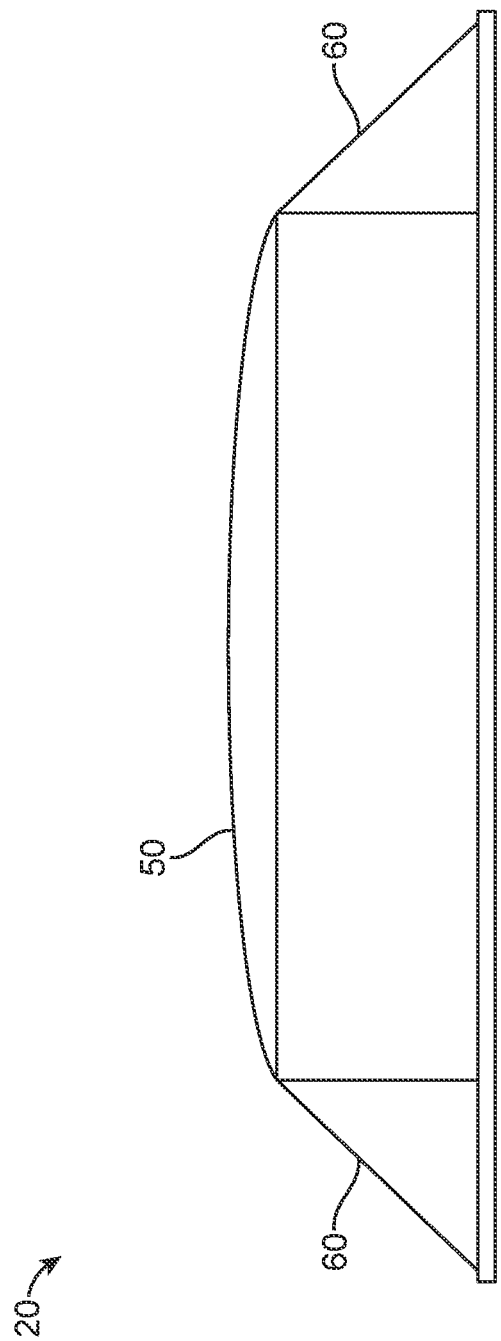
FIG. 2 is a longitudinal cross-section view of the center strip of the vehicle traction device.

In one embodiment, as illustrated in FIG. 2, the center strip (20) has an approximately trapezoidal cross section, with the upper surface (50) having a curved, convex shape. The height of the center strip (20) is preferably limited to allow clearance of roadway vehicles.

The sloped sides (60) of the center strip (20) are shaped and constructed to pose a deterrent to inadvertent lateral motion of vehicles that could otherwise result in spin-out, while permitting deliberate lane change maneuvers that may be required during vehicle operation. The upper surface (50) of the center strip preferably has a curved, convex shape to allow precipitation run-off and to avoid excessive accumulation. Other designs for the center strip (20) are, of course, possible. While the considerations above will guide the design of the center strip (20) for the most common applications, in appropriate cases one or more of these objectives might be sacrificed, if desired.

The entire center strip (20) could be constructed as a single, continuous piece. Alternatively, segments of a given length, each of which is a single, continuous piece, could be joined together to form the center strip (20). In another embodiment, however, the center strip could have an interior supporting structure (as described more fully below) enclosed within an outer membrane (70) which is relatively thin and flexible (see FIGS. 6 & 7).

Figure 3:
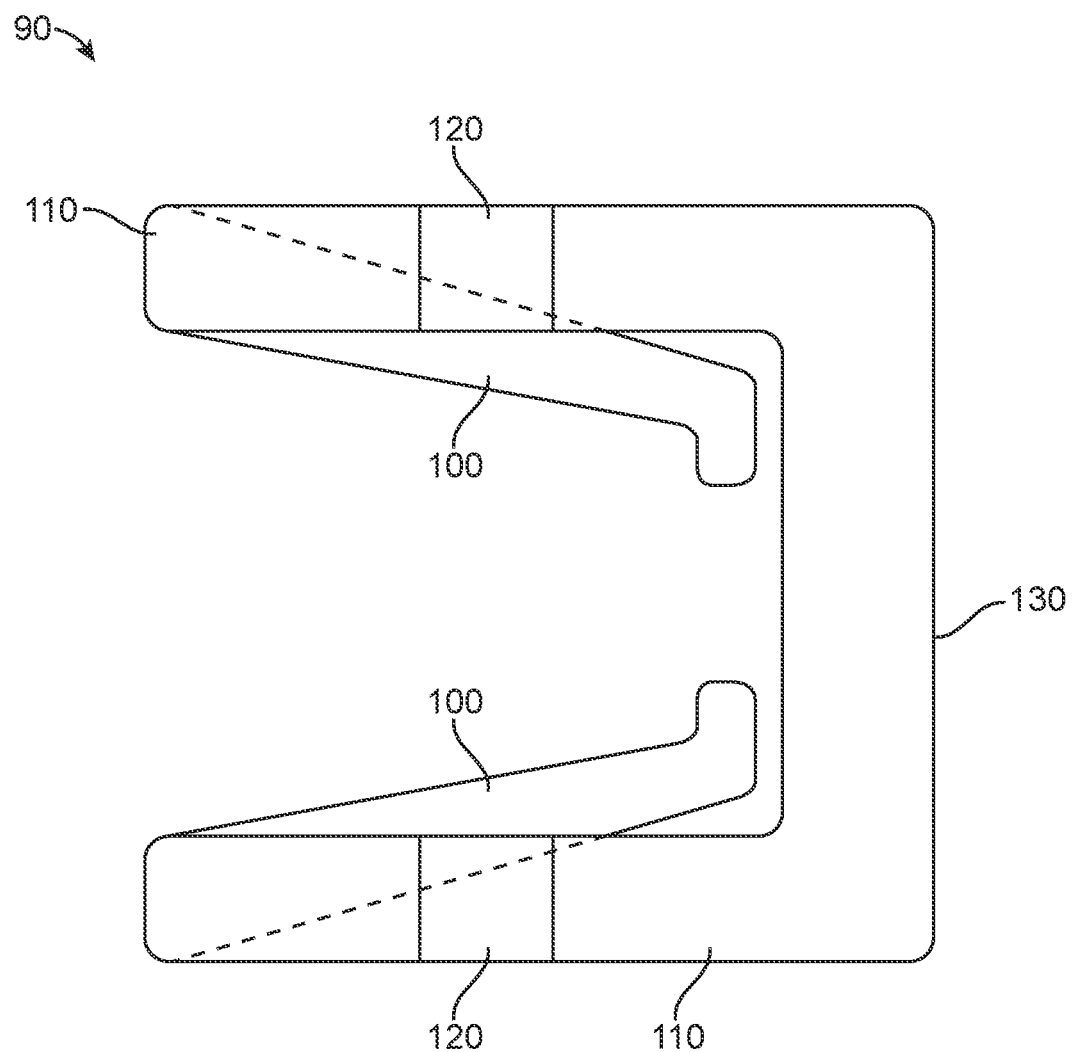
FIG. 3 is an overhead view of a collapsible support.
Figure 4:
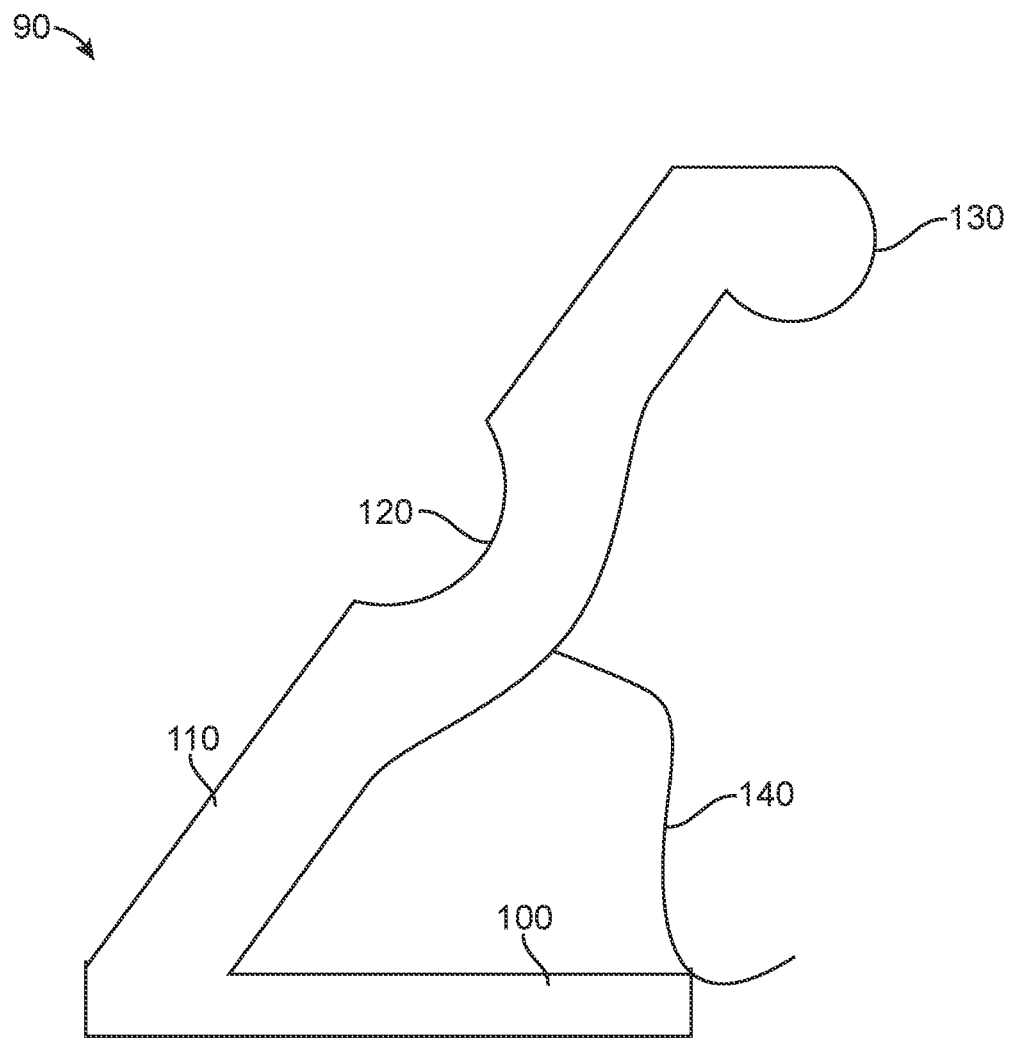
FIG. 4 is a side view of a collapsible support.
Figure 5:
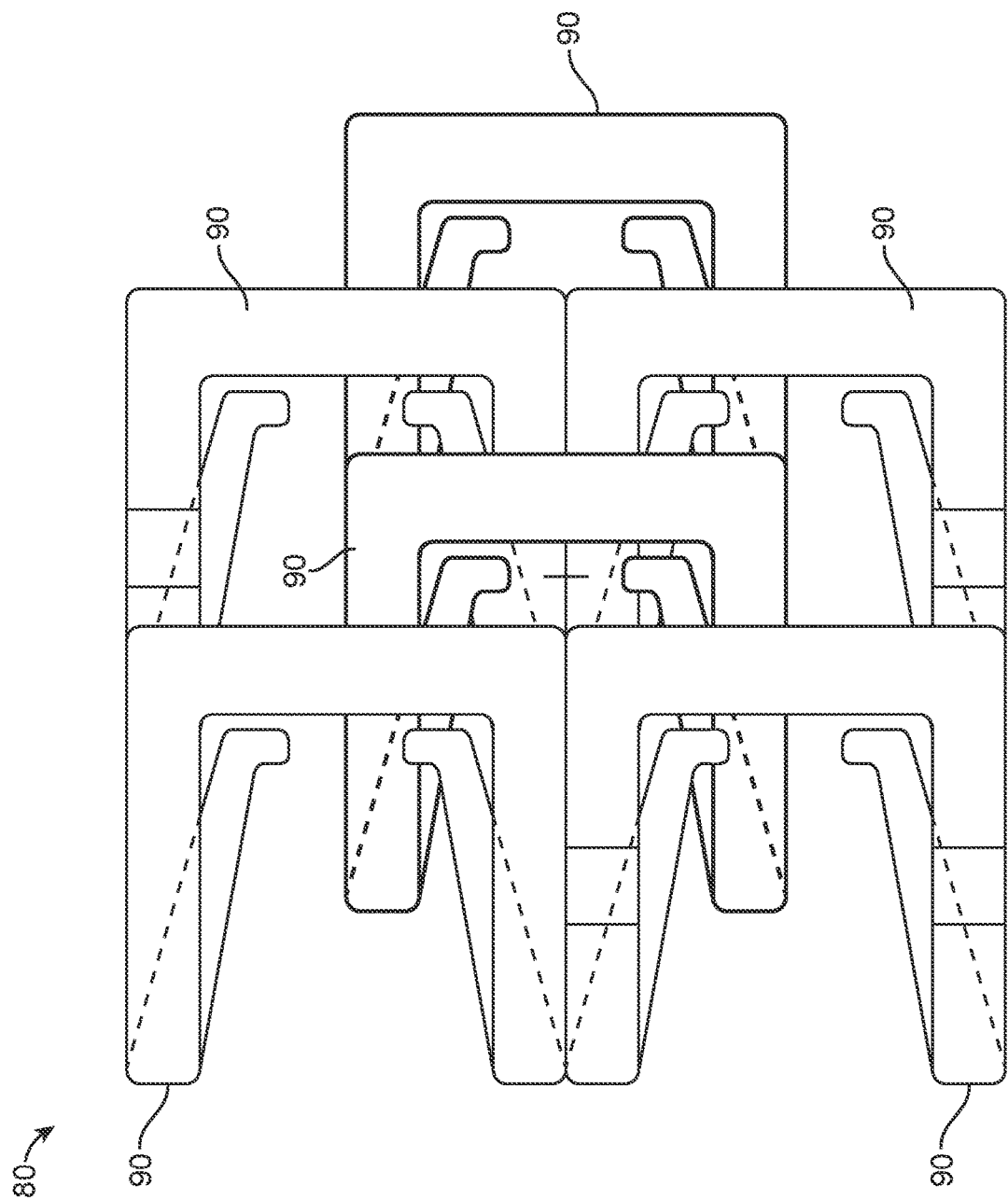
FIG. 5 is an overhead view of a collection of interlocking collapsible supports.

As illustrated in FIGS. 3 to 8, the center strip (20) can include a collapsible support system (80) featuring a network of collapsible supports (90) interconnected and arranged in a staggered configuration (see FIG. 5). FIGS. 3 and 4 show such a collapsible support (90) in overhead and side views, respectively. As shown, the collapsible support (90) can have an open, non-continuous shape to allow interlocking with other supports. Each collapsible support (90) includes two base arms (100), joined to two support arms (110). Each support arm (110) includes a concave groove (120) approximately midway along its length. The two support arms (110) of a collapsible support (90) are joined together by a cross bar (130) at the upper end of the support arms (110). The cross bar (130) is shaped to fit into the concave groove (120) of a neighboring collapsible support (90), allowing continuous dissipation of load and facilitating the interlocking structure of the collapsible supports (90).

The collapsible supports (90) could each be constructed as a single, continuous piece, provided that the material is sufficiently flexible to allow the support arms (110) to pivot about the point where they are joined to the base arms (100). In the alternative, the base arms (100) could be constructed separately from the remaining parts of the collapsible support (90) and could be joined to the respective support arms (110) by hinges or other flexible connectors.

Figure 6:
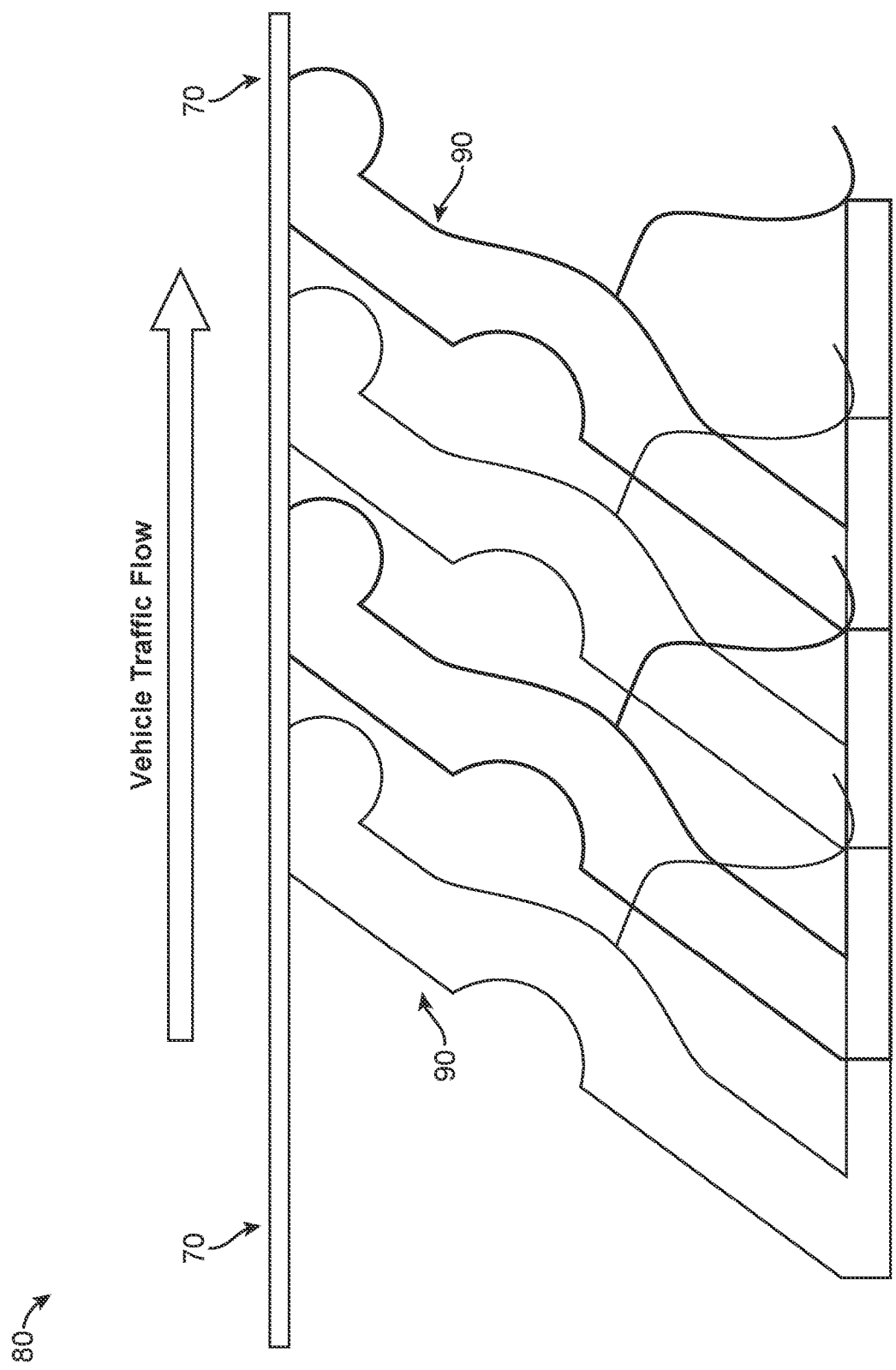
FIG. 6 is a side view of a collection of interlocking collapsible supports in vertically extended position.
Figure 7:
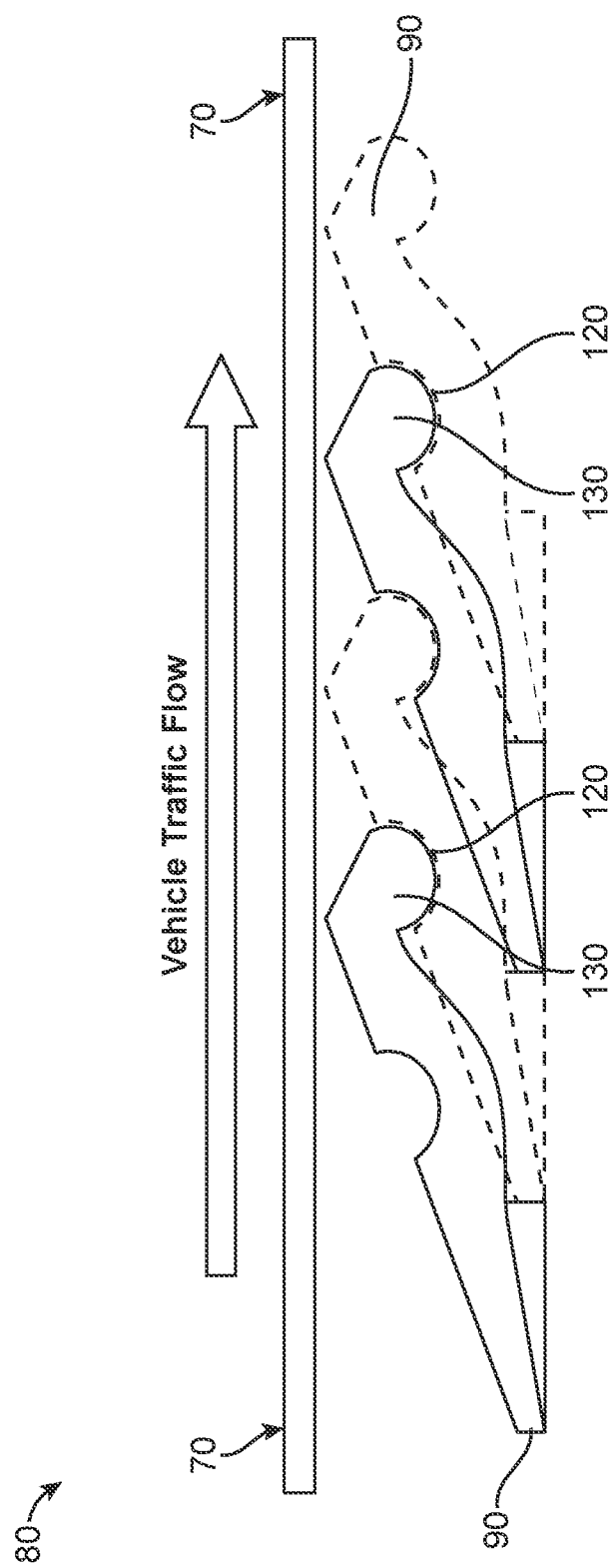
FIG. 7 is a side view of a collection of interlocking collapsible supports in vertically compressed position.

Each collapsible support (90) also includes one or more resisting elements (140) which could be a compression spring, torsion spring, or other similar mechanism attached to the base arms (100) and support arms (110) of a given collapsible support (90). In the alternative, as shown in FIGS. 4, 6 and 7, each resisting element (140) could be attached at one end to a support arm (110) of one of the collapsible supports (90), with a portion of the resisting element resting on the corresponding base arm (100) of the same collapsible support (90), and with its opposite end unattached and freely inserted into a hollow cavity provided in one of the support arms (110) of a directly adjacent collapsible support (90). As shown in FIG. 7, when the collapsible support system (80) is vertically compressed, the shape of the resisting element (140) will allow it to slide further into the cavity in the adjacent support arm (110). When the weight or other force compressing the collapsible support system (80) is removed, the elasticity of the material from which the resisting element (140) is made will cause it to return to its original shape, supplying opposing, spring-like forces to the base arm (100) on which it rests and the support arm (110) to which it is attached, respectively. Accordingly, the resisting element (140) is constructed and arranged to supply a resistive force in opposition to any motion of the support arms (110) toward the base arms (100).

The collapsible support system (80) is so designed that, when road clearing equipment or other vehicles move directly over and in direct contact with the center strip (20), each collapsible support (90) will be vertically compressed by the weight of each such vehicle. As the support arm (110) is pressed downward, the cross bar (130) will come to rest in the concave groove (120) of a staggered-adjacent collapsible support (90). As illustrated in FIG. 7, this arrangement will allow the center strip (20) to lie down relatively flat under the weight of a vehicle, such as road clearing equipment, when such a vehicle travels directly over the center strip (20) in the direction of travel. As the vehicle passes over the center strip (20), and the weight is removed from a given collapsible support (90), the resisting element (140) will cause the collapsible support (90), and the corresponding segment of the center strip (20), to return to its original height, as seen in FIG. 6.

Figure 8:
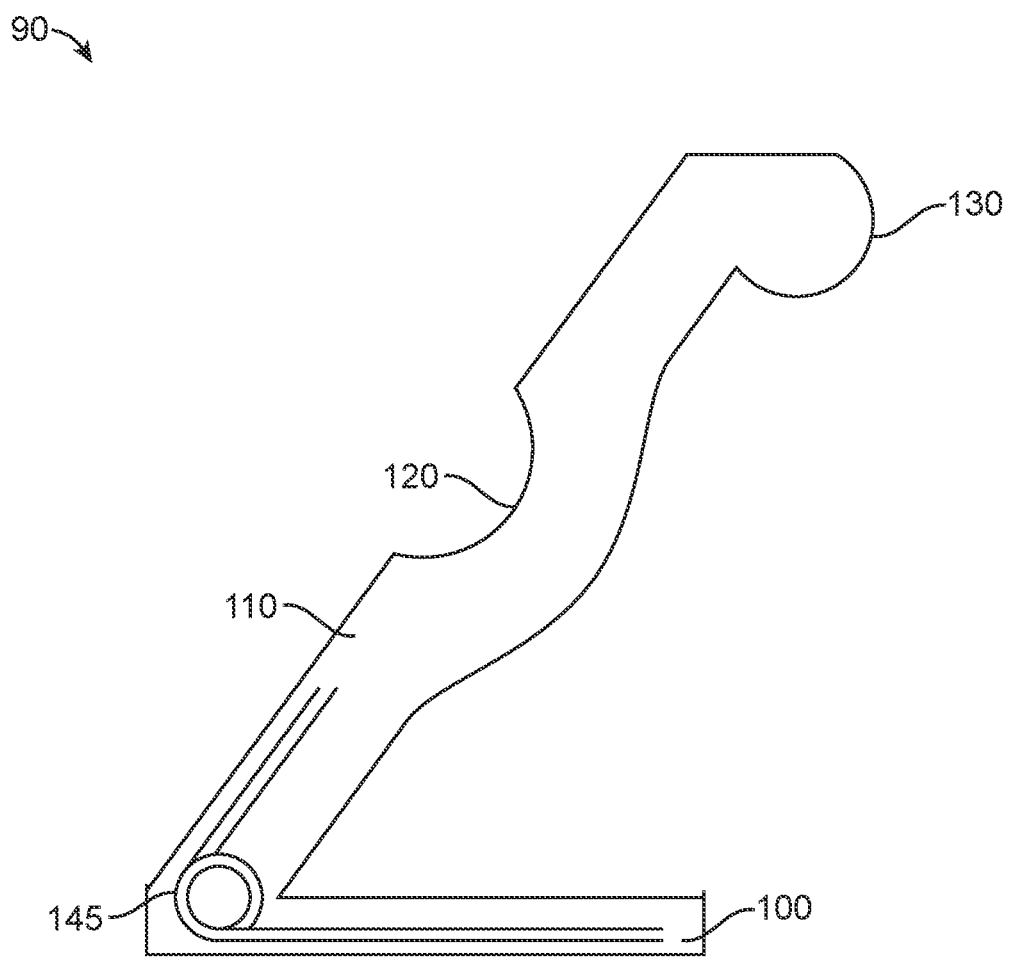
FIG. 8 is a side view of a collapsible support with an internal spring mechanism.

Those of skill in the art will recognize that the collapsible support system (80) may be accomplished through a variety of methods, and that the system of interlocking collapsible supports (90) described above is only one such method. As one alternative, for instance, the system of collapsible supports (90) would be largely the same, but the resistive element (140) could be a spring mechanism (145) supplied in the interior of a collapsible support (90) employing the tension of a coiled wire or small rod, similar in form and make-up to a safety pin, at the hinge point between the base arms (100) and support arms (110) as seen in FIG. 8. Another alternative would be to employ in the interior of the center strip (20) a dense, possibly spongy and/or foam-like, material selected based on its weather resistance, ability to rebound quickly, and ability to withstand side-loading. This material would serve as the core material of the center strip (20), beneath the outer membrane (70) that covers the entire center strip (20).

As mentioned above, the vehicle traction device (10) includes a plurality of strips running perpendicular to the flow of traffic and attached to the center strip (20). These perpendicular strips will include both angled strips (30) and bristle strips (40), which can be designed and constructed to be interchangeable and replaceable during placement and periodic maintenance.

Figure 9:
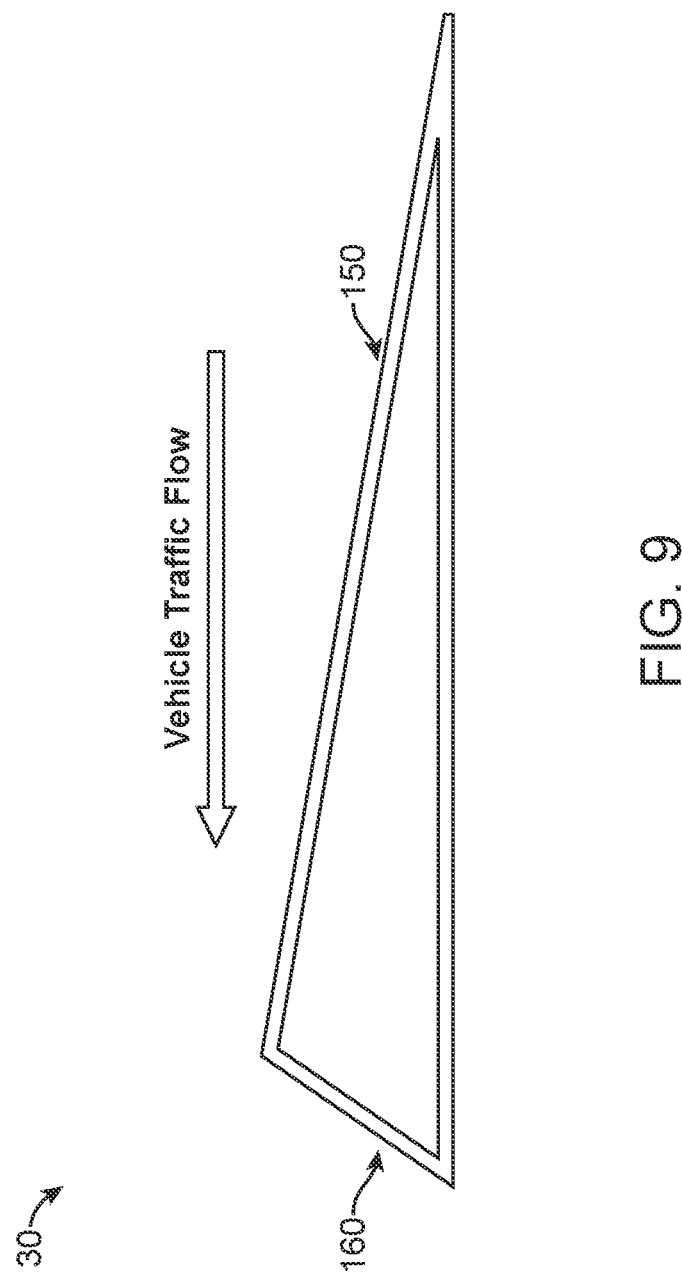
FIG. 9 is a side view of an angled strip of the vehicle traction device.

An angled strip (30), as illustrated in FIG. 9, is characterized by an approximately triangular cross section. The shallow edge (150) of the angled strip (30) is oriented toward the oncoming traffic flow to gradually allow a vehicle's tires to move upward while the vehicle travels over the angled strip (30). After reaching the top of the shallow edge (150) of the angled strip (30), a vehicle's tires will decline quickly along the steep edge (160). The steep edge (160) is arranged to provide additional traction and to deter unintended motion in the reverse direction relative to normal traffic flow. Where vehicles must travel across a roadway with a steep gradient, the orientation of the angled strips (30) could be reversed on descending portions of the roadway, so that the steep edge (160) of the angled strip (30) is oriented toward the oncoming traffic flow, to prevent vehicles from losing traction and slipping into run-away downhill motion.

Figure 10:
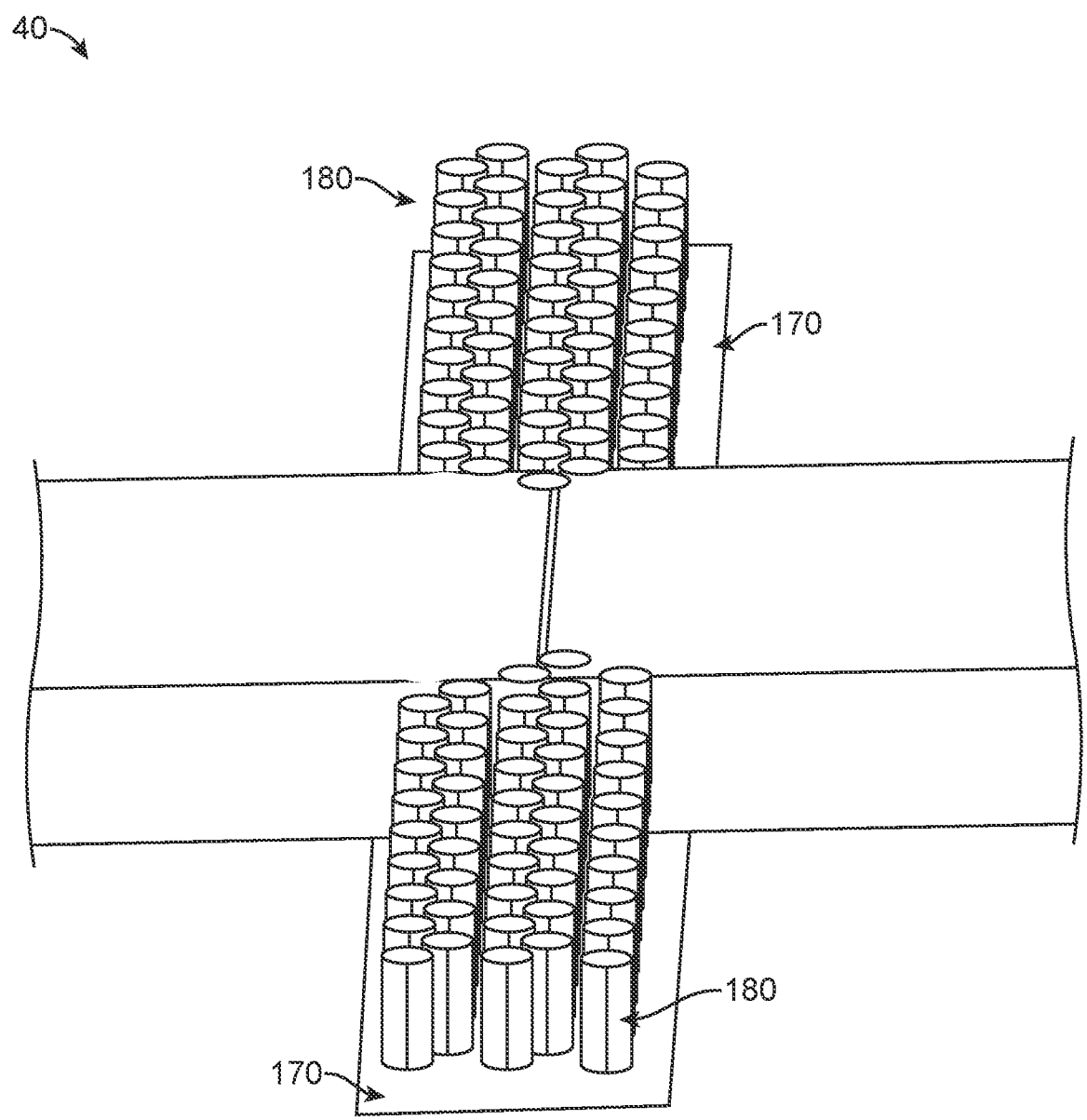
FIG. 10 is an isometric view of a bristle strip of the vehicle traction device, as attached to a portion of the center strip.

A bristle strip (40), as illustrated in FIG. 10, includes a bristle strip base (170) to which a plurality of bristles (180) are attached. The shape of the bristles (180) can vary considerably from cylindrical to conical to other possible shapes, as needed for optimized flexibility and durability in a given field of use and application.

In operation, the bristle strip (40) provides additional traction along the roadways. In addition, the bristles (180) engage the tires of vehicles passing over the bristle strip (40), dislodging and cleaning away ice and other accumulations on the vehicle's tires which may negatively impact traction.

The foregoing disclosure relates to, and is necessarily restricted to, one or more specific embodiments of the present invention. From this disclosure, those of skill in the art will recognize many variations and alternatives as to material, shape, size, design, configuration, combination, sub-combination, function, and manner of application and operation, which are nonetheless within the scope and spirit of the present invention. All such variations and alternatives should be understood as included within the invention and overall inventive concepts which are the subject of this application, equally as if expressly disclosed and described herein. Similarly, where any embodiment is described herein with specificity as to material, shape, size, design, configuration, combination, sub-combination, function, or manner of application and operation, such details and features are intended as illustration and example only, and not as limitations on the invention and overall inventive concepts disclosed.

The invention claimed is:

1. A vehicle traction device comprising:
A center strip whose height is such as would inhibit unintentional lateral movement of a typical motor vehicle relative to said center strip, without interfering with longitudinal movement of such a motor vehicle relative to said center strip; wherein said center strip comprises a collapsible support system enclosed within an outer membrane wherein said center strip is configured to receive at least one replaceable and interchange bristle strip and/or at least one angle strip, extending perpendicular to said center strip.

2. The vehicle traction device of claim 1, further comprising one or more angled strips connected to said center strip and extending perpendicular to said center strip, each of said angled strips having a bottom, a leading edge, and a trailing edge, with the angle between the bottom of said angled strip and the leading edge of said angled strip being less than the angle between the bottom of said angled strip and the trailing edge of said angled strip.

3. The vehicle traction device of claim 1, further comprising one or more bristle strips connected to said center strip and extending perpendicular to said center strip, each of said bristle strips comprising a bristle strip base and a plurality of protrusions attached to said bristle strip base and extending vertically above said bristle strip base.

4. The vehicle traction device of claim 1, wherein said collapsible support system comprises a spongy material that can be compressed vertically when force is applied and that will resume its original shape after the force is removed.

5. The vehicle traction device of claim 1, wherein said collapsible support system comprises a plurality of support elements, each support elements comprising: a base; two support arms; a cross bar; and a resisting element; the lower end of each support arm being flexibly attached to said base, each end of said cross bar being attached to the upper end of one of said support arms, and said resisting element engaging said base and at least one of said support arms such that, when said support arm moves toward said base, said resisting element will apply opposing forces to said support arm and said base.

6. The vehicle traction device of claim 5, wherein at least one of the support arms of one of said support elements includes a concave groove arranged and shaped so that, when the cross bar of an adjacent support element moves a sufficient distance toward the base of the same adjacent support element, said cross bar will fit into and rest upon said concave groove.

7. The vehicle traction device of claim 5, further comprising one or more angled strips connected to said center strip and extending perpendicular to said center strip, each of said angled strips having a bottom, a leading edge, and a trailing edge, with the angle between the bottom of said angled strip and the leading edge of said angled strip being less than the angle between the bottom of said angled strip and the trailing edge of said angled strip.

8. The vehicle traction device of claim 5, further comprising one or more bristle strips connected to said center strip and extending perpendicular to said center strip, each of said bristle strips comprising a bristle strip base and a plurality of protrusions attached to said bristle strip base and extending vertically above said bristle strip base.

9. The vehicle traction device of claim 5, wherein the resisting element of at least one of said support elements comprises a compression spring, one end of said compression spring being attached to the base of said support element and the other end of said compression spring being attached to one of the support arms of said support element.

10. The vehicle traction device of claim 9, wherein at least one of the support arms of one of said support elements includes a concave groove arranged and shaped so that, when the cross bar of an adjacent support element moves a sufficient distance toward the base of the same adjacent support element, said cross bar will fit into and rest upon said concave groove.

11. The vehicle traction device of claim 9, further comprising one or more angled strips connected to said center strip and extending perpendicular to said center strip, each of said angled strips having a bottom, a leading edge, and a trailing edge, with the angle between the bottom of said angled strip and the leading edge of said angled strip being less than the angle between the bottom of said angled strip and the trailing edge of said angled strip.

12. The vehicle traction device of claim 9, further comprising one or more bristle strips connected to said center strip and extending perpendicular to said center strip, each of said bristle strips comprising a bristle strip base and a plurality of protrusions attached to said bristle strip base and extending vertically above said bristle strip base.

13. The vehicle traction device of claim 5, wherein the resisting element of at least one of said support elements comprises a torsion spring, one end of said torsion spring being attached to the base of said support element and the other end of said compression spring being attached to one of the support arms of said support element.

14. The vehicle traction device of claim 13, wherein at least one of the support arms of one of said support elements includes a concave groove arranged and shaped so that, when the cross bar of an adjacent support element moves a sufficient distance toward the base of the same adjacent support element, said cross bar will fit into and rest upon said concave groove.

15. The vehicle traction device of claim 5, further comprising one or more angled strips connected to said center strip and extending perpendicular to said center strip, each of said angled strips having a bottom, a leading edge, and a trailing edge, with the angle between the bottom of said angled strip and the leading edge of said angled strip being less than the angle between the bottom of said angled strip and the trailing edge of said angled strip.

16. The vehicle traction device of claim 5, further comprising one or more bristle strips connected to said center strip and extending perpendicular to said center strip, each of said bristle strips comprising a bristle strip base and a plurality of protrusions attached to said bristle strip base and extending vertically above said bristle strip base.

17. The vehicle traction device of claim 5, wherein the resisting element of at least one support element comprises a resistance arm having a first end that is attached to one of the support arms of said support element; a curved portion that engages and rests upon the base of said support element; and a free end opposite to said first end; and wherein at least one of the support arms of an adjacent support element includes a hollow cavity, such that said free end is freely inserted into said hollow cavity, and such that, when the support arm to which said first end is attached moves toward the base upon which said curved portion rests, said free end will pass further into said hollow cavity, and said resistance arm will deform elastically and apply opposing forces to the support arm to which said first end is attached and the base upon which said curved portion rests.

18. The vehicle traction device of claim 17, wherein at least one of the support arms of one of said support elements includes a concave groove arranged and shaped so that, when the cross bar of an adjacent support element moves a sufficient distance toward the base of the same adjacent support element, said cross bar will fit into and rest upon said concave groove.

19. The vehicle traction device of claim 17, further comprising one or more angled strips connected to said center strip and extending perpendicular to said center strip, each of said angled strips having a bottom, a leading edge, and a trailing edge, with the angle between the bottom of said angled strip and the leading edge of said angled strip being less than the angle between the bottom of said angled strip and the trailing edge of said angled strip.

20. The vehicle traction device of claim 17, further comprising one or more bristle strips connected to said center strip and extending perpendicular to said center strip, each of said bristle strips comprising a bristle strip base and a plurality of protrusions attached to said bristle strip base and extending vertically above said bristle strip base.

* * * * *